Oct. 26, 1965 J. LODE 3,214,674
PHASE SEQUENCE SEGREGATION NETWORK FOR A THREE-PHASE SYSTEM
Filed March 14, 1960 2 Sheets-Sheet 1
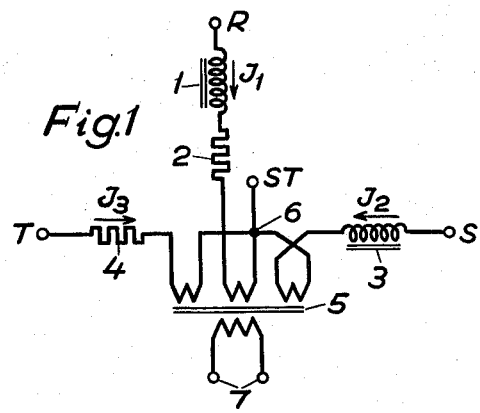
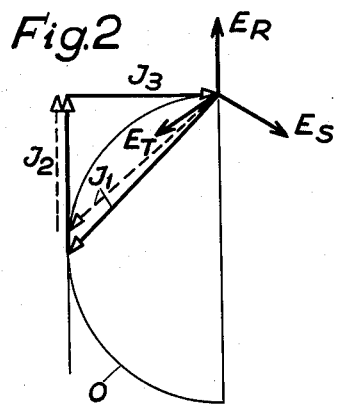
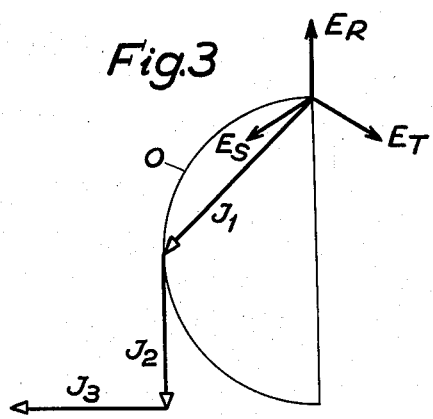
INVENTOR.
Jon Lode
BY Bailey, Stephens, Huettig
ATTORNEYS

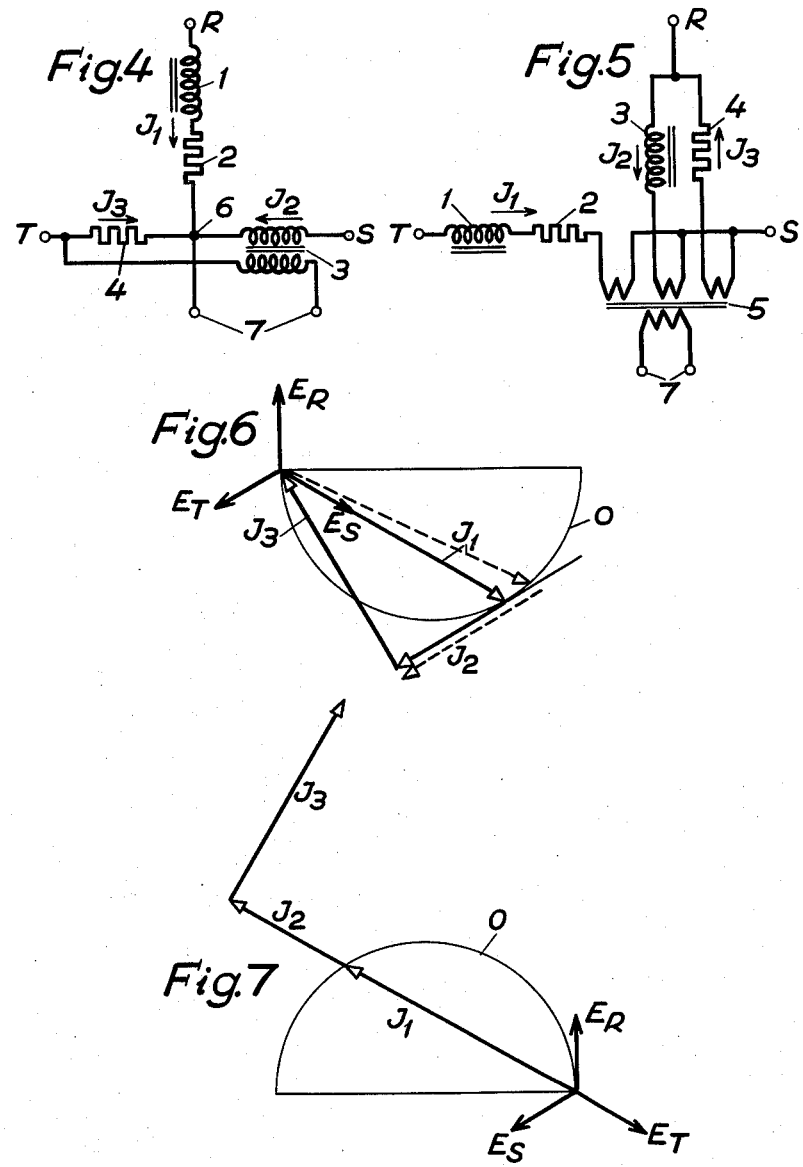

United States Patent Office 3,214,674
Patented Oct. 26, 1965

3,214,674
PHASE SEQUENCE SEGREGATION NETWORK FOR A THREE-PHASE SYSTEM
Jon Lode, Vasteras, Sweden, assignor to Allmanna Svenska Elektriska Aktiebolaget, Vasteras, Sweden, a Swedish corporation
Filed Mar. 14, 1960, Ser. No. 14,774
Claims priority, application Sweden, Mar. 19, 1959, 2,655/59
8 Claims. (Cl. 321—58)

The present invention relates to a phase sequence segregating network for the voltage components of a three-phase system, that is, a segregating network, the output quantity of which is proportional to the voltage component of one phase sequence, but substantially independent of the voltage components of the opposite phase sequence.

Existing voltage sensitive phase sequence segregating networks generally have the disadvantage that they are very frequency sensitive, which means that if the output quantity of the segregating network is zero when the three-phase system only comprises voltage components of the one phase sequence and of the nominal frequency of the segregating network, the output quantity will, as soon as the frequency deviates from this nominal value, deviate from zero by a value which is dependent upon the frequency deviation as well as the magnitude of the voltage component. For frequency variations consequently the segregating network acts as if the three-phase system comprised voltage components of the phase sequence for which the segregating network shall be sensitive.

The object of the present invention is to provide a phase sequence segregating network for the voltage components of a three-phase sequence, the operation of which is substantially independent of even large variations in the frequency of the three phase system and which consists of a small number of reliable and stable components.

According to the invention, the phase sequence segregating network comprises a first impedance means consisting of a resistance, a second impedance means consisting of an inductance and a third impedance means consisting of a resistance in series with an inductance, which impedance means are connected to different voltages derived from the voltages of the three-phase system. The impedance means are so dimensioned and the voltages to which they are connected are so chosen that, when the three-phase system comprises only voltage components of the phase sequence for which the segregated network shall be insensitive the sum of the currents through the impedance means is zero, and in a vector representation of these currents the vector for the current through the second impedance means is parallel to the tangent of the semi-circle constituting the locus with respect to varying frequency for the movable end of the vector for the current through the third impedance means, in the point upon said semicircle at which the movable end of said last mentioned vector is situated at the nominal frequency of said three-phase network, and the distance from this point upon the semicircle to the diameter of the semicircle is substantially equal to the length of the vector for the current through said second impedance means.

In the following the invention will be fully described with reference to the accompanying drawing in which, by way of example, FIGURES 1, 4 and 5 show three different forms of the invention. FIGURES 2 and 3 are vector representations of the segregating network shown in FIGURE 1 when the segregating network is connected to a three-phase system comprising only positive sequence voltage components and negative sequence voltage components respectively, and FIGURES 6 and 7 are corresponding vector representations for the segregating network shown in FIGURE 5. All segregating networks shown in the drawings are connected to operate as negative sequence segregating networks, that is, the output quantities of the segregating networks are proportional to the negative sequence voltage components of the three-phase system, but independent of the positive sequence voltage components.

The phase sequence segregating network shown in FIGURE 1 consists of three impedance means, the first consisting of a resistance 4, the second of a reactor 3 and the third of a reactor 1 in series with a resistor 2. The three impedance means are connected at one end to a common point 6 in series each with one primary winding of a current transformer 5. At the other end the impedance means are connected to the phases R, S, T of the three-phase system, the symmetry of which the segregating network shall supervise. The common junction point 6 is connected to the centre of the line voltage between the phases S and T of the three-phase system. The output terminals 7 of the segregating network are connected to the secondary windings of the current transformer 5.

FIGURE 2 shows a vector representation of the currents through the different impedance means of the segregating network according to FIGURE 1, presuming that the three phase system comprises only positive sequence voltages with the phase sequence R, S, T. The voltage vectors $E_R$, $E_S$, $E_T$ indicate the phase angles of the phase voltages of the three-phase system. The reactor 1 and the resistor 2 are so dimensioned that the current $I_1$ through them has a phase lag of 45° with respect to the voltage at the nominal frequency of the segregating network. The reactor 3 and the resistor 4 are so dimensioned in relation to the reactor 1 and the resistor 2 that the sum of the currents $I_1$, $I_2$ and $I_3$ upon the common point 6 is zero, as shown in the vector representation in FIGURE 2. The apex of the vector $I_1$ for the current through the reactor 1 and the resistor 2 moves when the frequency varies along the locus O which consists of a semicircle. The vector for the current $I_2$ through the inductive impedance means is parallel to the tangent to the locus O in the point at which the apex of the vector $I_1$ is situated at the nominal frequency of the segregating network. The impedance means are further so dimensioned that the distance from this point upon the locus O to the diameter of the semicircle is substantially equal to the length of the vector $I_2$ at the nominal frequency. If the frequency varies, the apex of the vector $I_1$ certainly moves along the locus O but simultaneously the length of the vector $I_2$ will change correspondingly so that the sum of the currents through the impedance means upon the common point 6 is still substantially zero. The dotted vectors represent the state when the frequency has increased by about 20%. So long as the three phase system comprises only positive sequence voltages, the current through the secondary winding of the current transformer 5 will consequently be zero, substantially independent of even comparatively large variations in the frequency of the three phase system.

FIGURE 3 is a corresponding vector representation of the current through the impedance means of the segregating network according to FIGURE 1 when the segregating network is connected to a three-phase system comprising only negative sequence voltages with the phase sequence R, T, S. As shown in FIGURE 3 the sum of the currents through the impedance means upon the common point 6 will in this case no longer be zero, but the secondary winding of the current transformer 5 will supply a current which is proportional to the magnitude of the negative sequence voltage components of the three-phase system.

The phase sequence segregating network shown in FIGURE 4 is designed in the same way as the one shown in FIGURE 1 with the exception that it does not comprise any current transformer and that the common point 6 is not connected to any fixed potential in the three-phase system. Instead, the reactor 3 is provided with a secondary winding and one of the output terminals of the segregating network is connected to phase T in the three-phase system in series with said secondary winding, whereas the other output terminal is connected to the common junction point 6 of the three impedance means.

The operation of this segregating network is most readily understood with reference to the segregating network shown in FIGURE 1. In this segregating network the sum of the currents upon the common junction point 6, as described above, is always zero, independent of frequency variations, as long as the three-phase system comprises only positive sequence voltage components. For a pure positive sequence voltage consequently, no current flows between the junction point 6 and the terminal ST. It is consequently possible to interrupt the connection between the junction point 6 and the terminal ST without influencing the potential of the junction point 6 in any way. For a pure positive sequence voltage consequently, the junction point 6 of the segregating network shown in FIGURE 4 will always, independent of frequency variations, have a potential midway between the potentials of the phases S and T in the three-phase system. If the ratio between the primary and secondary windings of the reactor 3 is one, no voltage will exist between the output terminals 7 of the segregating network, independent of frequency variations, as long as the three-phase network comprises only positive sequence voltages. For a negative sequence voltage in the three-phase system, however, the sum of the currents upon the common junction point 6 is not zero as has been explained in conjunction with the segregating network shown in FIGURE 1. In this case consequently a resulting current flows between the junction point 6 and the terminal ST. If in this case one interrupts the connection between the junction point 6 and the terminal ST, as has been done in the segregating network shown in FIGURE 4, the point 6 will evidently assume a different potential. It can be shown that in the segregating network shown in FIGURE 4, the junction point 6 will assume a potential closer to the potential of the phase R of the three-phase system when the three-phase system comprises a pure negative sequence voltage. As a consequence a voltage will arise between the output terminals 7 of the segregating network, which voltage is proportional to the magnitude of the negative sequence voltage in the three-phase system.

The phase sequence segregating network shown in FIGURE 5 consists, just as those described previously, of three impedance means, one consisting of a resistor 4, the second of a reactor 3, and the third of a reactor 1 in series with a resistor 2. Also in this case the impedance means are connected in series each with one primary winding of the current transformer 5 to the secondary winding of which the output terminals 7 are connected. The inductive impedance means and the resistive impedance means are, however, in this case, connected in parallel with one another across the line voltage between the phases R and S of the three-phase system, whereas the third impedance means, consisting of an inductance in series with a resistance, is connected to the line voltage between the phases S and T.

FIGURE 6 is a vector representation of the currents through the impedance means when the three-phase system comprises only a positive sequence voltage. The reactor 1 and the resistor 2 are so dimensioned that the current $I_1$ through them has a phase lag of 30° with respect to the voltage at the nominal frequency of the segregating network. The reactor 3 and the resistor 4 are so dimensioned in relation to the reactor 1 and the resistor 2 that the sum of the currents through the impedance means is zero as shown in the vector representation in FIGURE 6. The apex of the vector $I_2$ in this case also moves at frequency variations, along a locus O consisting of a semicircle. Further the vector $I_2$ for the current through the inductive impedance means is parallel to the tangent to the locus O at the point in which the apex of the vector $I_1$ is situated at the nominal frequency, and the impedance means are so dimensioned that the distance from the apex of the vector $I_1$ to the diameter of the locus O is substantially equal to the length of the vector $I_2$ for the current through the inductive impedance means. As a consequence, the movement of the apex of the vector $I_1$ along the locus O at a frequency variation will correspond to an equally large variation of the length of the vector $I_2$. The sum of the currents through the impedance means will consequently remain substantially zero independent of the variations in the frequency. The dotted vectors represent the state when the frequency of the three-phase system has decreased by about 20%. Consequently, no current will be produced in the secondary winding of the current transformer, independent of frequency variations, as long as the three-phase system comprises only positive sequence voltages.

FIGURE 7 shows a corresponding vector representation of the currents through the impedance means when the three phase system comprises only negative sequence voltages. As shown by the vector representation, the sum of the currents through the impedance means will in this case no longer be zero due to which a current will be supplied by the secondary winding of the current transformer 5, the magnitude of which is proportional to the magnitude of the negative sequence voltage component of the three phase system.

I claim:

1. In combination with a three-phase system, filter-network for producing an output quantity proportional to the voltage components of said system of one phase sequence but substantially independent of the voltage of the voltage components of the opposite phase sequence, said filter-network comprising three impedance means a first of which consists of a resistance, a second of which consists of a reactance and a third of which consists of a resistance in series with an inductive reactance, means connecting said three impedance means at one end to a phase of a common point and, at the other end, to said three phase system, and means connected to at least one of said phases to produce said output quantity, said third impedance means being so dimensioned that the phase angle between current and voltage is 45° at the nominal frequency of the three-phase system, whereby, when said three-phase system comprises voltage components only of the phase sequence for which the filter-network is to be insensitive, the sum of the current through said three impedance means is zero and, in a vector representation of said currents, the vector for the current through said second impedance means is parallel to the tangent to the semicircle constituting the locus with respect to frequency for the movable end of the vector for the current through said third impedance means, at the point on said semicircle at which the movable end of said last-mentioned vector is situated at the nominal frequency of said network, and the perpendicular distance between said point and the diameter of said semicircle is substantially equal to the length of said first-mentioned vector.

2. In a system as claimed in claim 1, said output quantity producing means comprising a transformer having primary windings in said connecting means between each impedance means and said common point, and a secondary winding giving said quantity.

3. In a system as claimed in claim 2, said connecting means connecting such other ends of said impedance means each to a different phase of said system.

4. In a system as claimed in claim 2, said connecting means connecting such other ends of the first and second impedance means to one phase of the system, the other end of the third impedance means to another phase of the system, and means connecting said common point to the third phase of the system.

5. In a system as claimed in claim 1, said connecting means connecting such other ends of said impedance means each to a different phase of said system, said second impedance means consisting of a reactor and a winding upon said reactor, said reactor having a second winding constituting said quantity producing means, and means connecting said second winding in series with said first impedance means.

6. A phase sequence segregating filter network for a three-phase system for producing an output quantity proportional to the voltage components of said three-phase system of one phase sequence but substantially independent of the voltage components of the opposite phase sequence, said filter-network comprising three impedance means a first of which consists of a resistance, a second of which consists of a reactance and a third of which consists of a resistance in series with a reactance, means connecting said three impedance means at one end to a common point and, at the other end, each to one of the phases of said three-phase system, a curent transformer having three primary windings, one of which is arranged in said connecting means between each of said impedance means and said common point, and a secondary winding, said output quantity of the segregating network consisting of the current through said secondary winding.

7. A phase sequence segregating filter network for a three-phase system for producing an output quantity proportional to the voltage components of said three-phase system of one phase sequence but substantially independent of the voltage components of the opposite phase sequence, comprising a first impedance means consisting of a resistance, a second impedance means consisting of a reactance and a third impedance means consisting of a resistance in series with a reactance, means connecting said impedance means at one end to a common point and, at the other end, each to one of the phases of said three-phase system, said second impedance means consisting of a reactor and a winding upon said reactor, said reactor having a second winding, and means connecting said second winding in series with said first impedance means, the output quantity of the segregating network consisting of the voltage across said second reactor winding.

8. A phase sequence segregating filter network for a three-phase system for producing an output quantity proportional to the voltage components of said three-phase system of the one phase sequence but substantially independent of the voltage components of the opposite phase sequence, comprising a first impedance means consisting of a resistance, a second impedance means consisting of a reactance and a third impedance means consisting of a resistance in series with a reactance, a current transformer having three primary windings and one secondary winding, means connecting said impedance means each at one end of said primary windings, means connecting the other ends of said primary windings to a common point of the filter network, means connecting the other ends of said first and second impedance means to one phase, means connecting said third impedance means to another phase and said common point to the third phase of the three phase system, said output quantity of the segregating network consisting of the current through said secondary winding.

References Cited by the Examiner
UNITED STATES PATENTS

| | | | |
|---|---|---|---|
| 1,271,524 | 7/18 | Burke | 318—220 |
| 1,912,907 | 6/33 | Mengele | 307—13 |
| 2,000,767 | 5/35 | Lewis | 324—86 |
| 2,470,661 | 5/49 | Sonnemann | 307—13 |
| 2,546,021 | 3/51 | Sonnemann | 307—13 |
| 3,004,208 | 10/61 | Williamson | 321—58 |
| 3,040,230 | 6/62 | Biringer | 321—7 |

LLOYD McCOLLUM, *Primary Examiner.*

ORIS L. RADER, MILTON O. HIRSHFIELD,
*Examiners.*